March 23, 1948. W. W. HANSEN ET AL Re. 22,990
MODULATION SYSTEM
Original Filed April 14, 1938
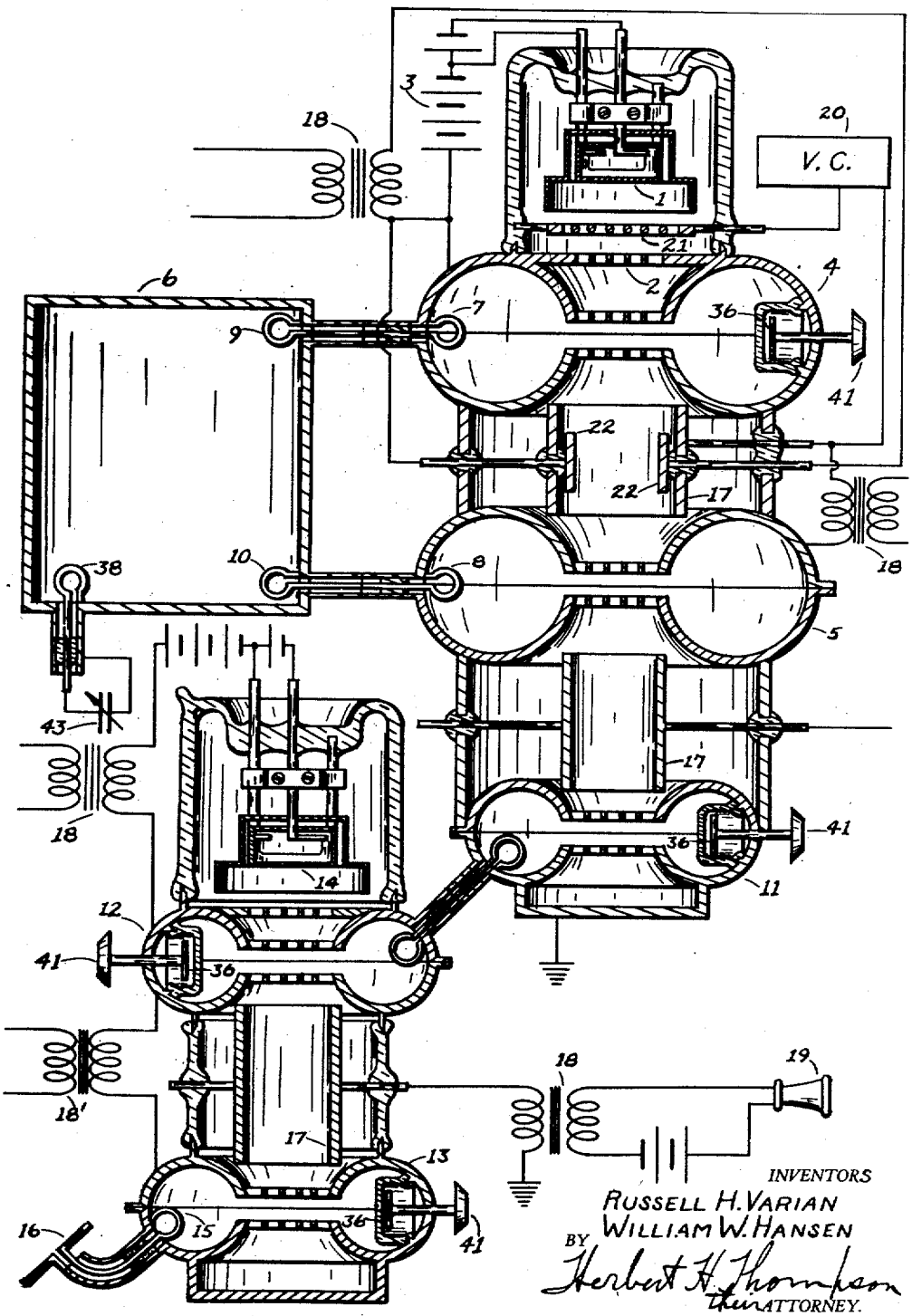
INVENTORS
RUSSELL H. VARIAN
WILLIAM W. HANSEN
BY Herbert H. Thompson
their ATTORNEY.

Reissued Mar. 23, 1948 Re. 22,990

UNITED STATES PATENT OFFICE 22,990

MODULATION SYSTEM

William W. Hansen, Garden City, and Russell H. Varian, Wantagh, N. Y., assignors to The Board of Trustees of The Leland Stanford Junior University, Stanford University, Calif., a corporation of California Original No. 2,281,935, dated May 5, 1942, Serial No. 326,150, March 27, 1940, which is a division of Serial No. 201,898, April 14, 1938. Application for reissue March 1, 1943, Serial No. 477,668

78 Claims. (Cl. 179—171.5)

This invention relates, generally, to radio transmission and reception, and the invention has reference more particularly to radio transmitting and receiving apparatus operating at ultra high frequencies, and employing cavity resonator devices, or tubes, excited by electron streams.

The present application is a division of copending application Serial No. 201,898, filed April 14, 1938, for Radio transmission and reception, now Patent No. 2,280,824 issued April 28, 1942, which in turn is a continuation-in-part of copending application Serial No. 185,382, filed January 17, 1938, now Patent No. 2,415,094, granted February 4, 1947.

The principal object of the present invention is to provide, in connection with an electron stream excited cavity resonator or tube oscillator or amplifier, means for effecting modulation of the output of such oscillator and/or amplifier.

Another object of the present invention is to provide a novel oscillator and/or amplifier of the above character employing electrode means and a connected modulating supply for selectively effecting frequency, phase and amplitude modulation at will of the output of said oscillator and/or amplifier.

Still another object of the present invention is to provide, in connection with an electron stream type oscillator and/or amplifier, electrode means excited at the frequency of the apparatus for effecting optimum operation efficiency of the apparatus.

Yet another object of the present invention is to provide, in connection with an electron stream type oscillator and/or amplifier, means for effecting optimum operating efficiency of the apparatus by enhancing bunching or grouping of the electron stream.

A further object of the invention is to provide electrode tube means for effecting frequency modulation of an electron stream type oscillator and/or amplifier, said apparatus employing additional electrode means for eliminating amplitude modulation of the output of the apparatus.

Still another object of the invention is to provide feed-back means in an oscillator, which feed-back means employs a cavity resonator having a high Q for effecting frequency stability of the oscillator.

A still further object of the present invention is to provide improved electron beam apparatus for the multiplication of high frequencies.

Other objects and advantages will become apparent from the specification, taken in connection with the accompanying drawings wherein the invention is embodied in concrete form.

The single figure of the drawing is a circuit diagram of a typical transmitter conforming to the principles of the present invention. Referring to the drawing, there is disclosed an electron stream excited cavity oscillator consisting of cavity, or hollow resonators 4 and 5 that are excited by a stream of electrons emitted from the cathode 1, and accelerated by accelerating voltage supplied by battery 3, connected to the cathode and to the resonator 4 having the accelerating grid 2. The cavity resonators 4 and 5 in operation contain standing electromagnetic waves having a frequency determined by the dimensions of the cavities. The electrons are projected as a stream through the grid 2 and through the grids of successive resonators 4 and 5. Resonators 4 and 5 are back-coupled through use of loops 8, 10 and 9, 7 and a large resonator 6.

Elements 4 and 5 operate as an oscillator largely as described in the copending Varian application Serial No. 168,355, filed October 11, 1937, now Patent No. 2,242,275, granted May 20, 1941, but instead of coupling directly from the second device 5 to a device 4, as described before, they are coupled through a third hollow resonator device 6 preferably made considerably larger than 4 or 5 so that it will have a fundamental frequency much lower than the fundamental frequency of devices 4 and 5, and operating at one of its higher mode frequencies. As one of the consequences of the theory of hollow resonator operation set forth in Hansen application Serial No. 92,787, filed July 27, 1936, now Patent No. 2,190,712, issued February 20, 1940, it is well known that the ratio of the inductive reactance to the resistance of a resonant device is higher for the higher modes than for the fundamental frequency. Also, from the theory of radio circuits it is well known that frequency stability is a function of this ratio which is commonly designated by the letter Q. Accordingly in this invention device 6 is operated on one of its higher modes for coupling between devices 4 and 5. A value of Q of the order of $10^4$ is not uncommon in these devices operating on the fundamental frequencies. It can be increased to $10^5$ or $10^6$ by using one of the higher harmonics. This, of course, increases the frequency stability of the system.

The theory developed for the velocity grouped electronic oscillator set forth in Patent No. 2,242,275 shows that the bunched beam contains many harmonics of the fundamental bunching frequency and that the beam can excite circuits oscillating at the harmonic frequencies as well as at the fundamental. This property is used as shown in the figure wherein the bunched electron beam after emerging from device 5 is used to excite another device 11 whose fundamental frequency is that of a Fourier harmonic of the frequency of the devices 5 and 4. This harmonic may be an even or an odd multiple of the frequency of resonators 4 and 5, although the third harmonic has been found to give desirable results. Devices 4 and 5 act as a master oscillator and device 11 as a frequency multiplier. The output of device 11 is shown amplified in devices 12 and 13 which are provided with an electron beam emitter 14 and the usual battery and collimating grid. The amplified high frequency energy is shown as connected for delivery by a coupling loop 15 to an antenna 16 from which it is radiated. Obviously energy could be radiated directly from device 11, if desired.

Modulation of the signal can be accomplished in a number of ways as indicated in the figure. One way is to use a tube 17 between any two of the resonant devices, or cavity resonators, and to vary its potential as by using a transformer 18 connected to a modulating device such as a telephone transmitter 19, or some other means of producing a modulating voltage. The tube 17 is illustrated in three different possible locations in the figure. The effect of the modulating tube 17 is different in the several locations shown. In its location between cavity resonators 4 and 5 it shifts the phase of energy transfer between resonators 4 and 5. In such a system where feed-back occurs, as it does in this instance, shifting the phase between two resonant components of the circuit changes the frequency somewhat as a function of the voltage applied and may also be made to change the amplitude of the oscillations.

In the arrangement shown "pure frequency modulation" can be attained by having the voltage on tube 17 control also a volume control 20, as of the amplifier or potentiometer types, connected to a modulating grid 21 which counteracts the amplitude modulating effect of tube 17. By this means tube 17 can modulate the frequency of the system without modulating its amplitude.

The effect of modulating tube 17 in the locations between cavity resonators 5 and 11, or between resonators 12 and 13 is to phase modulate the output of the system, the phase shift of the oscillations in member 11 or 13, as the case may be, being a function of the voltage applied to tube 17. In phase modulation the oscillator including cavity resonators 4, 5 and 6 oscillate steadily at their normal stable frequency, while the frequency multiplying resonator 11 and the amplifying resonators 12 and 13 oscillate at the same frequency but with shifting phase between resonator 5 and the output resonator 13. The phase shifting effect between resonators 5 and 11 is the same as between resonators 4 and 5, but there is no feed-back from resonator 11 to change the system frequency. If cavity resonator 11 is operating at a frequency that is the $n$th harmonic, where $n$ is an integer, of the frequency of cavity resonators 4 and 5, the phase shift of the $n$th harmonic component of bunching in the electron beam in tube 17 is $n$ times the phase shift of the fundamental component. The effect of the tube 17 between cavity resonators 12 and 13 is the same as when it is between cavity resonators 5 and 11 as far as output at 16 is concerned. The entire effect is phase modulation.

Amplitude modulation of the system can be accomplished by grid 21, as described but not claimed in our copending application Serial No. 185,382, filed January 17, 1938, of which the present application is a continuation-in-part. It can also be accomplished by spaced plates 22 in the figure connected respectively to the sides of the secondary of transformer 18 which is supplied with a suitable modulating voltage. Plates 22 deflect the electron stream passing between them so that the effectiveness of the stream is varied as a function of the stream deflection by the plates 22. The effectiveness of the stream is a maximum when it is centered in the system and such effectiveness is reduced by deflection to either side. Accordingly, the system is adjusted so that without modulation the beam rests at some intermediate position where the effect is less than maximum so that double frequency modulation is avoided. The same effect can be attained by blocking off a portion of the grids of cavity resonator 5.

When the tube 17 is located between cavity resonators 12 and 13 the amount of phase shift per unit of applied voltage is somewhat different than that obtained when this tube is placed between resonators 5 and 11.

Plates 22 have another possible use. If, instead of exciting them at a modulating frequency, they are excited at the oscillation frequency of the system the electron beam between the plates 22 can be shifted at the oscillating frequency. By adjusting the assemblage so that the electron stream is shifted considerably to one side reaching its maximum shift when the electron stream bunches at the grids of cavity resonator 5 are in the phase least productive of system oscillation, and so that the stream is centered when the stream bunching at resonator 5 is at its optimum phase for producing oscillation, the bunching economy of the stream is improved. That is, the possible transfer of stream energy to the oscillating device 5 may be increased, by deflection, somewhat beyond the theoretical maximum percentage possible with bunching alone. For most effective operation the plates 22 would be replaced by a deflecting cavity resonator, as shown in application Serial No. 193,268, filed March 1, 1938, now Patent No. 2,272,165, granted February 3, 1942.

Amplitude modulation can be accomplished by the additional method of changing the voltage between the amplifier electron emitter 14 and cavity resonator 12 as shown in the figure by use of modulating transformer 18. An additional method of accomplishing phase modulation is to change the voltage between amplifier resonators 12 and 13 by use of transformer 18'.

The frequency adjustment of the several cavity resonators referred to in the figure can be accomplished by any of the methods shown in the parent case above referred to as by use of handles 41 for turning elements 36. Usually all such cavity resonators but one in a system should be adjustable. In the figure, the unadjusted device is shown at 5. The frequency adjustment of resonator 6 is accomplished by varying condenser 43 connected to loop 38.

In the copending application Serial No. 185,382 transmitters are shown used with parabolic reflectors. Such a combination is generally applicable for transmitters of the frequencies of the order of $10^9$ cycles per second or higher. It is also in frequencies of this order that frequency stability enhanced by use of resonator 6 may be very important.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. The method of generating high frequency electromagnetic waves through use of electron stream coupled circuits operating at fundamental and harmonic frequencies respectively, which consists of producing in an electron stream changes in electron velocity, causing the electron stream to excite a circuit having a selected fundamental frequency for sustaining operation of the system, and causing the same stream thereafter to excite a circuit having a frequency which is a harmonic of the said fundamental frequency.

2. The method of modulating the envelope of the high frequency output of ultra-high frequency electron beam apparatus which consists of initiating recurrent changes in electron density of the beam at a region in the path thereof at ultra-high frequency, and effecting modulation of said ultra-high frequency by changing the time of flight of the electrons in the beam between said region and a point of energy absorption from the beam in accordance with an applied lower frequency modulation.

3. In an oscillator of the character described having means for producing a velocity grouped electron stream, means for supplying a modulating signal, electrode means connected to be activated by said modulating signal and acting on the stream for effecting frequency and some undesired amplitude modulation of the stream, and counteracting electrode means controlled from said modulating signal also acting on the stream for canceling the amplitude modulation thereof.

4. In a device of the character described, means including an emitter and electron accelerating voltage supply means for providing an electron stream, a hollow resonator positioned for receiving the stream, means for exciting said resonator to effect velocity grouping of the stream, and means for varying the electron accelerating voltage to effect amplitude modulation of said stream.

5. In an electron stream excited oscillator having electron grouping and energy interchanging means, feed back means comprising a cavity resonator connected to both said electron grouping and energy interchanging means, said cavity resonator having a high Q for effecting frequency stability of the oscillator.

6. In an electron stream excited oscillator, means for producing an electron stream, a pair of spaced hollow resonators excited by the electron stream and a feed back connection between said resonators comprising a hollow resonator operating on a harmonic of its fundamental frequency.

7. In apparatus of the character described, a pair of spaced resonators, means for producing an electron stream for passing through said resonators, and means for applying a modulating voltage to said stream in a region between said resonators to effect phase modulation of the output of said apparatus.

8. In apparatus of the character described, a pair of spaced resonators, means for exciting one of said resonators, means for producing an electron stream and for exciting the other of said resonators by the passage of the stream therethrough, an electrode positioned between said resonators, and means for applying a modulating potential to said electrode for modulating the output of said apparatus.

9. An oscillator of the character described, including means for producing an electron stream, means for effecting electron grouping of said stream, spaced means for deriving high frequency electrical energy from said stream, and an additional element for changing the phase of arrival of said electron groups in said energy deriving means to thereby change the frequency of said oscillator.

10. An oscillator of the character described, including means for producing an electron stream, means for effecting electron grouping of said stream, spaced means for deriving high frequency electrical energy from said stream, back coupling means connected from said energy deriving means to said electron grouping means, and an additional element for changing the phase of arrival of said electron groups in said energy deriving means to thereby change the phase of the output of said oscillator.

11. In apparatus of the character described, means for producing an electron stream, means for initiating electron grouping in said stream at ultra-high frequency, spaced means for deriving oscillatory energy from said grouped stream, and modulating means for altering the time of transit of said groups from said group initiating means to said means for deriving oscillatory energy at a frequency lower than said electron grouping frequency.

12. The method of modulating the output of ultra-high frequency electron beam apparatus which consists of initiating recurrent changes at ultra-high frequency in electron density of the beam at a region in the path thereof, and effecting modulation by thereafter shifting the beam transversely of its course at a frequency lower than said electron density changes at a point between said region and a point of energy absorption from the beam in accordance with the applied modulation.

13. High frequency apparatus comprising means for producing an electron stream having recurrent variations in electron density at a region in the path thereof, means for inductively absorbing high frequency energy from said stream at a point along the path thereof spaced from said region, and means for shifting said stream transversely of said path between said point and said region, in accordance with modulating signals, to produce modulation of said absorbed high frequency energy.

14. In an electron stream excited oscillator, means for producing an electron stream, a pair of spaced hollow resonators excited by the electron stream, and means for stabilizing said oscillator comprising an additional hollow resonator coupled to at least one of said resonators.

15. In a device of the character described, means including an emitter and electron accelerating voltage supply means for producing an electron stream, hollow resonator means positioned for receiving said stream, and means for varying the electron accelerating voltage for varying the operating frequency of said resonator means.

16. In an electron stream excited oscillator, means for producing an electron stream, electron grouping and energy interchanging means and a cavity resonator coupled to said electron grouping and energy interchanging means.

17. A harmonic frequency generator comprising means for producing an electron stream, means coacting with said stream for effecting recurrent grouping of the electrons of the stream at an initial frequency, and hollow resonator means having a natural frequency that is a multiple of said initial frequency, said hollow resonator means being positioned to be excited by said grouped stream for supplying a frequency higher than said initial frequency.

18. A high frequency device comprising means for generating a harmonic frequency, said means including means for producing an electron stream, and hollow resonator means positioned for effecting recurrent grouping of the electrons of the stream at a high frequency and for abstracting energy from said stream at a harmonic of said high frequency.

19. The method of shifting the phase of electromagnetic oscillations in an energy absorbing circuit which consists of producing a stream of electrons, passing the stream through an electromagnetic field arranged to change the vector velocity of the electrons, passing the stream of variable vector velocity electrons through the energy absorbing circuit to set up electromagnetic oscillations therein, and passing the stream through an electric field to change the time interval existing between the act of changing the vector velocity and the resultant delivery of electromagnetic energy to the energy absorbing circuit.

20. Phase shifting apparatus comprising means for producing a stream of electrons, means providing an electromagnetic field along the path of said stream and arranged to change the vector velocity of the electrons, means providing an energy-absorbing circuit along the path of said variable-vector-velocity electrons for setting up electromagnetic oscillations in said circuit, and means providing a variable electric field along the path of said stream for changing the time interval existing between the act of changing the vector velocity and the resultant delivery of electromagnetic energy to the energy-absorbing circuit.

21. The method of electrically adjusting the resonant frequency of a high frequency electronic device employing an exciting electron stream having a relatively long flight time, said device having electron grouping and energy absorbing means coupled so that the energy absorbing means will excite the electron grouping means, consisting of changing the flight time of electrons of the electron stream between the electron grouping and the energy absorbing means to effect a change in the phase of electron groups arriving in the energy absorbing means relative to the oscillations present in the energy grouping means, and thereby altering the resonant frequency of said device.

22. In a tube structure, a plurality of mutually spaced resonant circuits arranged to have alternating electric fields, means for passing a stream of electrons through said alternating electric fields, and potential applying means independent of said first named means and operating on the stream for controlling the flight time of electrons of the stream between the alternating electric fields of said circuits.

23. The method of modulating the envelope of the high frequency output of ultra high frequency electron beam apparatus which consists of initiating recurrent changes in electron velocity of the beam at ultro high frequency at a region in the path thereof, absorbing energy from the beam, and effecting modulation of said ultra high frequency by changing the time of flight of the electrons in the beam between said region and the point of said energy absorption in accordance with an applied modulation signal.

24. In apparatus of the character described, a pair of spaced resonators, means for projecting an electron beam through said resonators in succession, an electrode positioned between said resonators, and means for applying a control potential to said electrode for controlling the output of said apparatus.

25. In apparatus of the character described, a pair of spaced resonators, means for projecting an electron stream through said resonators, and means for applying a control field to said stream in a region between said resonators.

26. In apparatus of the character described, means for producing an electron stream, means for initiating electron grouping in said stream at ultra high frequency, spaced means for deriving oscillatory energy from said grouped stream, and means for controlling the time of flight of said groups from said group initiating means to said energy deriving means in accordance with modulating signals to modulate said derived energy.

27. In apparatus of the character described, means for producing an electron stream, means including a cavity resonator along the path of said stream for producing recurrent high frequency electron grouping in said stream, means for extracting high frequency oscillatory energy from said grouped stream, and means operating on said electron stream for modulating said extracted oscillatory energy in accordance with a modulation signal.

28. Apparatus for producing modulated high frequency electromagnetic waves, comprising means for producing an electron stream, means for producing recurrent high frequency grouping of electrons in the stream, means including a cavity resonator along the path of said stream for extracting high frequency energy from said grouped stream, and means for producing and varying an electric field in a region along the path of said electron stream to effect corresponding variations in the extraction of high frequency energy by said energy extracting means.

29. The method of producing modulated radio waves which comprises passing a stream of electrons through a conducting member providing a space resonant cavity having standing waves therein, whereby the vector velocities of the electrons in said stream are altered, causing standing waves to be established in a second conducting member providing a space resonant cavity by interaction of the variable vector velocity electron stream and the second conducting member cavity, and modulating the standing waves in the second member cavity by alteration of the number of electrons in the stream passing through said second cavity.

30. The method of modulating an electron beam velocity-grouped high frequency translating device having a space-resonant energy-absorbing circuit, comprising producing alternating increments and decrements in the speed of electrons in the electron beam, thus producing velocity grouping in the beam, and applying electrical potentials to cause the velocity-grouped beam to deliver varying amounts of high frequency energy to the energy-absorbing circuit.

31. Apparatus for producing modulated high frequency electromagnetic waves, comprising means for producing an electron stream, means for producing grouping of the electrons of said stream, means for extracting high frequency electromagnetic energy from said electron stream, and means for altering the magnitude of the electron current of said stream to modulate said energy.

32. High frequency apparatus comprising means for producing a stream of electrons, means for producing a recurrent grouping of the electrons of said beam, cavity resonator means for causing said grouped electrons to produce an oscillating electromagnetic field, and means for modulating said oscillating field.

33. Electron discharge apparatus for producing a modulated velocity-varied electron beam, comprising means for producing an electron beam, means for controlling said beam by an undulating electromagnetic field to produce periodic variations in the velocity of the electrons of said beam, and means for producing modulation of said velocity-varied beam in accordance with modulating signals.

34. A velocity modulation type electron discharge tube, comprising means for velocity modulating a beam of electrons, means positioned in the path of said beam in advance of said first-mentioned means for allowing said velocity modulated electrons to form into groups, means for extracting energy from said grouped electrons positioned in the path of said beam in advance of said second-named means, and means for controlling the transit time of the electron beam, comprising a control electrode mounted within said second-named means and lead-in means for applying a predetermined potential to said electrode.

35. A tube according to claim 32, wherein said second-named means provides a shielded space between said first- and third-named means, and said electrode comprises a hollow cylinder within said shielded space.

36. A tube according to claim 32, wherein said controlling means comprises a hollow electrode, and conductor means insulated from the other portions of the tube and symmetrically spaced with respect to said electrode and connected thereto.

37. In an electron-stream-excited oscillator having electron-grouping and energy-interchanging means, feedback means comprising a hollow cavity resonator connected to both said electron-grouping and energy-interchanging means, said resonator operating on a higher resonant frequency than its lowest resonant frequency.

38. In an electron-stream-excited oscillator, means for producing an electron stream, a pair of spaced hollow cavity resonators coacting with said electron stream, and a feedback connection between said resonators comprising a further hollow cavity resonator.

39. High frequency apparatus comprising means for producing an electron stream, a pair of cavity resonators in energy-interchanging relation to said stream, and a tunable cavity resonator coupled to one of said first resonators.

40. High frequency apparatus comprising an oscillator having a cavity resonator as a frequency-determining element thereof, and a further tunable cavity resonator independent of said oscillator and coupled electromagnetically to said oscillator resonator for controlling the output frequency of said oscillator.

41. The method of generating high frequency electromagnetic waves, which consists of producing changes in electron velocity in an electron stream at a fundamental frequency and causing the stream thereafter to excite a circuit having a resonant frequency which is a harmonic of said fundamental frequency.

42. The method of generating high frequency electromagnetic waves which consists of producing an electron stream having the electrons thereof grouped in bunches which pass a predetermined point at a predetermined frequency, and causing said stream to excite a circuit having a resonant frequency which is a harmonic of said predetermined frequency.

43. A high frequency generator comprising means for producing an electron stream, means for effecting recurrent grouping of the electrons of said stream at a predetermined frequency, and means including circuit means tuned to a frequency higher than said predetermined frequency for abstracting energy from the electrons of said stream at said higher frequency.

44. A harmonic frequency generator comprising means for producing an electron stream, means for effecting recurrent grouping of the electrons of said stream at a predetermined frequency, and means including circuit means tuned to a harmonic of said predetermined frequency for abstracting high frequency energy from the electrons of said stream at said harmonic frequency.

45. A high frequency device for generating a harmonic frequency comprising means for producing an electron stream and means for effecting recurrent grouping of the electrons of said stream at a high frequency and for abstracting energy from said stream at a harmonic of said high frequency, said last means including circuit means tuned to said harmonic.

46. A frequency multiplier for ultra high frequencies, comprising a first cavity resonator having electron-permeable walls and adapted to provide an undulating electric field, a second cavity resonator tuned to a harmonic of the resonant frequency of said first resonator and having electron-permeable walls, and means for projecting an electron beam successively through the walls of said first and second resonators.

47. An electron discharge tube of the velocity modulated electron stream type comprising a first electrode, a second electrode, means for projecting a stream of electrons along a path from said first electrode to said second electrode; a velocity modulation circuit resonant to a first frequency located in said path adjacent to the first electrode, and an extractor circuit resonant to a second frequency higher than said first frequency, located in said path between said velocity modulation circuit and said second electrode.

48. A velocity modulating discharge tube comprising means for producing a stream of electrons along a path, means forming a velocity modulating resonant chamber tuned to a given frequency, in partial intercepting relation with said path, and means forming a resonant extracting chamber in intercepting relation with said path, tuned to a frequency higher than and positioned beyond said velocity modulating resonant chamber.

49. A velocity modulation discharge tube comprising means for producing a stream of electrons, a velocity modulation circuit tuned to a given frequency, a first extractor circuit tuned to said given frequency, a second extractor circuit tuned to a different frequency, coupling means interconnecting said velocity modulation circuit and said first extractor circuit and an output connection from said second extractor circuit.

50. A velocity modulating discharge tube comprising means for producing a stream of electrons along a path, means forming a velocity modulating resonant chamber tuned to a given frequency, in partial intercepting relation with said path, and means forming a resonant extracting chamber in intercepting relation with said path, said resonant extracting chamber being positioned beyond said velocity modulating resonant chamber and tuned to an odd harmonic of said given frequency.

51. A velocity modulation discharge tube comprising a velocity modulation circuit, a first extractor circuit and a second extractor circuit, means for directing a stream of electrons through said circuits in succession, said velocity modulation circuit and said first extractor circuit being tuned to the same given frequency and said second extractor circuit being tuned to an odd harmonic of said given frequency, means for feeding back energy from said first extractor circuit to said velocity modulation circuit to cause a production of oscillations, and means for extracting energy from said second extractor circuit.

52. A frequency multiplier comprising a velocity modulating discharge tube having means forming a first resonant chamber tuned to a given frequency, means for producing a stream of electrons along a path through said first resonant chamber, means coupled with said first resonant chamber and in partial intercepting relation with said path for modifying the velocity of some of the electrons in said stream, means including a drift tube in alignment with said path for allowing the electrons modified in velocity to form bunches in said stream, means forming a second resonant chamber of low loss characteristics in alignment with said path beyond said drift tube in the direction of flow of said electrons and tuned to a harmonic of said fundamental frequency, and means in said second resonant chamber for extracting energy from said bunched electron stream to produce oscillations in said second chamber at its resonant frequency.

53. Means for producing ultra high frequency comprising a source of electrons for producing an electron stream, a first resonant circuit tuned to a particular frequency, means coupled with said first resonant circuit for modifying the velocity of electrons in said stream, drift-tube means allowing the electrons modified in velocity to form into groups, a second resonant circuit tuned to said particular frequency for extracting energy from said grouped electrons, means intercoupling said first resonant circuit and said second resonant circuit to sustain oscillations at said particular frequency, a third resonant circuit of low loss characteristics tuned to a harmonic of said particular frequency, drift-tube means allowing said grouped electrons to pass to said third circuit from said second circuit, means in said third circuit for extracting energy from said grouped electrons to excited oscillations therein at said harmonic, and output means coupled with said third resonant circuit for utilizing the harmonic frequency energy.

54. Electron discharge apparatus comprising means forming a resonant chamber tuned to a frequency to be generated, means for producing a stream of electrons along a path, means in partial intercepting relation with said path for grouping electrons from said stream into a stream of grouped electrons in accordance with a frequency lower than that of said resonant chamber, and means disposed intermediate said grouping means and said resonant chamber for projecting said stream of grouped electrons past said resonant chamber.

55. Ultra high frequency apparatus comprising means for producing an electron stream, a first cavity resonator having electron permeable walls and positioned to have said stream pass therethrough, means for exciting said resonator with ultra high frequency energy whereby the electrons of said stream are recurrently varied in velocity, further cavity resonator means spaced from said first resonator and positioned to receive said velocity varied electron stream after the electrons have become bunched, and means located between said first and second resonators for transversely deflecting said beam at the frequency of said high frequency energy, the phase of said deflection being related to the phase of said velocity variation in a manner to produce increased bunching of electrons of said beam before reception thereof in said second resonator.

56. Ultra high frequency apparatus comprising means for producing an electron stream, means including a first cavity resonator having electron permeable walls for recurrently varying the velocity of the electrons of the stream, further means including a second cavity resonator spaced from said first resonator for utilizing said velocity varied stream after the electrons thereof have become bunched, and means located between said first and second resonators for transversely deflectiong said beam at the frequency of said velocity variation to produce increased bunching of the electrons of said beam before entrance thereof into said second resonator.

57. Ultra high frequency apparatus comprising means for producing an electron stream, first cavity resonator means for recurrently varying the velocity of the electrons of said stream, further cavity resonator means for receiving said velocity varied electron stream after the electrons thereof have become bunched, and means located between said first and further resonator means for causing only highly concentrated bunches of said bunched electron stream to enter said second resonator means, said means including diverter electrodes for diverting electrons between said bunches before reception of said bunches by said further cavity resonator.

58. Ultra high frequency apparatus comprising means for producing an electron stream, means for recurrently varying the velocity of the electrons of said stream, further means spaced from said velocity varying means for receiving said velocity varied electron stream after the electrons thereof have become bunched, and means for preventing all but the highly concentrated bunches of said bunched electron stream from entering said electron receiving means, said last means including diverter electrodes for diverting electrons between said bunches before reception of said bunches by said stream-receiving means.

59. Ultra high frequency apparatus as claimed in claim 58, wherein said electron-receiving means comprises resonant circuit means tuned to a harmonic of the frequency of said velocity variation, whereby high frequency energy harmonically related to said velocity variation frequency may be extracted from said stream, the enhancement of the bunching action by said preventing means, thereby producing an increased multiplied frequency energy output.

60. Ultra high frequency apparatus comprising means for producing a grouped electron stream, means for utilizing said grouped stream, and means for enhancing the sharpness of grouping of said stream before utilization thereof, said last-named means comprising diverter electrodes for diverting electrons between said groups, whereby only the highly grouped electrons are utilized by said utilizing means.

61. Velocity modulation electron discharge tube apparatus comprising means for producing a stream of electrons, means including a buncher resonator in energy-interchanging relation with said stream for recurrently varying the velocity of said electrons, means including a catcher resonator in energy-interchanging relation with said stream for extracting high frequency energy from said velocity-varied electron stream, means for coupling said buncher and catcher resonators to maintain sustained oscillations, and further resonator means for extracting energy from said stream after interaction thereof with said catcher resonator.

62. Velocity modulation electron discharge tube apparatus comprising means for producing a stream of electrons, means for recurrently varying the velocity of said electrons, means for extracting high frequency energy from said velocity-varied stream, means for coupling said velocity-varying and energy-abstracting means to maintain sustained oscillations, and tuned circuit means in energy-interchanging relation with said electron stream for extracting energy from said stream after interaction of said stream with said first energy abstracting means.

63. An oscillator comprising an elongated tubular envelope, means for producing an electron beam longitudinally through the envelope, a first set of conductive elements coupled to the beam for producing velocity modulation thereof, means providing a drift space to be traversed by the beam after production of such velocity modulation, the drift space being sufficiently long to effect transformation of the velocity modulation into charge density modulation of a higher order of magnitude, means providing a feed-back coupling between the portion of the beam issuing from the drift space and the said conductive elements thereby to maintain the oscillator in self-sustained oscillation, and another set of conductive elements coupled to the last-mentioned portion of the beam independently of the feed-back means for abstracting energy from the beam.

64. Velocity modulation electron discharge tube apparatus comprising means for producing a stream of electrons, self-excited regenerative means for producing and maintaining the electrons of said stream in grouped relation, and independent tuned circuit means for inductively abstracting high frequency energy from said grouped stream and spaced along said stream from said regenerative means.

65. The method of operating an electron discharge device which comprises the steps of causing the initiation of a space flow of electrons, causing said flow to be subjected to successive processes of density and velocity modulation in accordance with certain signal intelligence, and inductively abstracting energy from said stream along different portions over the length thereof, subsequent to the velocity modulation process.

66. The method of operating an electron discharge device which comprises the steps of causing the initiation of a space flow of electrons, causing said flow to be subjected to successive processes of density and velocity modulation, applying a signal to vary the degree to which the density modulation process is effective, and inductively abstracting energy from the stream along different portions over the length thereof, subsequent to the velocity modulation process.

67. The method of operating an electron discharge device which comprises producing a stream of electrons along the axis of said device, modulating said stream of electrons with different frequencies, and inductively abstracting from said modulated stream along different portions of the length thereof energy at different frequencies.

68. In a high frequency system, an electron discharge device having means for producing an electron stream, means for modulating said stream with different frequencies, and a plurality of differently tuned resonant circuits spaced along the length of said modulated stream and in coupling relation thereto for abstracting therefrom energy at different frequencies, different translating circuits coupled to said resonant circuits, and a collector electrode for gathering the electrons.

69. In a high frequency system, an electron discharge device having means for producing an electron stream, means for modulating said stream with different frequencies, and a plurality of elements spaced along the length of said modulated stream for inductively deriving energy therefrom, and different translating circuits coupled to said elements.

70. Apparatus in accordance with claim 69, characterized in this that said plurality of elements constitute resonant circuits.

71. Electron discharge apparatus comprising a hollow resonator having a gap, means for projecting a stream of electrons through the interior of said resonator and across said gap including a cathode electrode and a collector electrode on opposite sides of said resonator, means for modulating the density of said stream in accordance with frequency waves including a grid electrode located between said cathode and the gap of said resonator, and means for subsequently modulating the velocity of said stream.

72. The method of operating an electron discharge device which comprises producing a stream of electrons along the axis of said device, modulating said stream of electrons with different frequencies, and abstracting from said modulated stream along different portions of the length thereof energy at different frequencies.

73. In a high frequency system, an electron discharge device having means for producing an electron stream, means for modulating said stream with different frequencies, and a plurality of differently tuned resonant circuits spaced along the length of said modulated stream and in inductive coupling relation thereto for abstracting therefrom energy at different frequencies, different translating circuits coupled to said resonant circuits, and a collector electrode for gathering the electrons.

74. In a high frequency system, an electron discharge device having means for producing an electron stream, means for modulating said stream with different frequencies, and a plurality of elements spaced along the length of said modulated stream for inductively deriving energy therefrom, and different translating circuits coupled to said elements.

75. Apparatus in accordance with claim 74, characterized in this that said plurality of elements constitute resonant circuits.

76. Electron discharge apparatus comprising a hollow resonator having a gap, means for projecting a stream of electrons through the interior of said resonator and across said gap including a cathode electrode and a collector electrode on opposite sides of said resonator, means for modulating the density of said stream in accordance with predetermined frequency waves including a grid electrode located between said cathode and the gap of said resonator, and means for subsequently modulating the velocity of said stream.

77. In combination, electron discharge device apparatus having means for producing an electron stream, means for modulating said stream with a predetermined frequency, means for subsequently modulating said stream with a different frequency, and a plurality of tuned circuits tuned to different frequencies spaced along said stream for abstracting from said stream energy of said different frequencies.

78. High frequency apparatus comprising means for producing an electron stream, means for velocity modulating said stream at a given frequency, further means for modulating said stream at a different frequency, and means for inductively extracting energy of a still different frequency from said stream.

WILLIAM W. HANSEN.
RUSSELL H. VARIAN.

REFERENCES CITED

The following references are of record in the file of this patent:

UNITED STATES PATENTS

| Number | Name | Date |
|---|---|---|
| Re. 21,739 | Llewellyn | Mar. 4, 1941 |
| 1,854,274 | Prinz | Apr. 19, 1932 |
| 1,999,884 | Salzberg | Apr. 30, 1935 |
| 2,122,283 | Harris | Apr. 30, 1938 |
| 2,141,750 | Herald | Dec. 27, 1938 |
| 2,190,511 | Cage | Feb. 13, 1940 |
| 2,220,839 | Hahn | Nov. 5, 1940 |
| 2,235,497 | Heil | Mar. 18, 1941 |